(12) United States Patent
Kozinsky et al.

(10) Patent No.: US 8,563,173 B2
(45) Date of Patent: Oct. 22, 2013

(54) LI-ION BATTERY WITH ANODE CURRENT COLLECTOR COATING

(75) Inventors: Boris Kozinsky, Newton, MA (US); John F. Christensen, Mountain View, CA (US); Nalin Chaturvedi, Sunnyvale, CA (US); Jasim Ahmed, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 1036 days.

(21) Appl. No.: 12/437,774

(22) Filed: May 8, 2009

(65) Prior Publication Data
US 2010/0285360 A1 Nov. 11, 2010

(51) Int. Cl.
*H01M 4/66* (2006.01)

(52) U.S. Cl.
USPC .................. 429/216; 429/245; 429/231.95

(58) Field of Classification Search
USPC .................................. 429/216, 231.95, 245
See application file for complete search history.

(56) References Cited

U.S. PATENT DOCUMENTS

| | | | |
|---|---|---|---|
| 5,641,591 A * | 6/1997 | Kawakami et al. | 429/231.5 |
| 6,046,575 A | 4/2000 | Demuro | |
| 6,773,616 B1 | 8/2004 | Chen et al. | |
| 7,029,796 B2 | 4/2006 | Choi et al. | |
| 2004/0214091 A1 | 10/2004 | Lim et al. | |
| 2004/0242804 A1 | 12/2004 | Medsker et al. | |
| 2006/0154141 A1 | 7/2006 | Salot et al. | |
| 2006/0216603 A1 | 9/2006 | Choi | |
| 2007/0042267 A1 | 2/2007 | Kim et al. | |
| 2007/0202400 A1 | 8/2007 | Yoshida et al. | |
| 2008/0044732 A1 | 2/2008 | Salot et al. | |
| 2008/0058194 A1 | 3/2008 | Grader et al. | |

OTHER PUBLICATIONS

Christensen, J. and J. Newman, Effect of anode film resistance on the charge/discharge capacity of a lithium-ion battery. Journal of the Electrochemical Society, 2003. 150(11): p. A1416-A1420.

Christensen, J. and J. Newman, Cyclable Lithium and Capacity Loss in Li-Ion Cells. Journal of the Electrochemical Society, 2005. 152(4): p. A818-A829.

Amatucci, G.G. and N. Pereira, Flouride based electrode materials for advanced energy storage devices. Journal of Flourine Chemistry, 2007. 128(4):p. 243-262.

Mikhaylik, Y. Fundamental Chemistry of Sion Power Li/S Battery, in International Battery Association and Hawaii Battery Conference. 2006. Waikoloa, HI.

Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.

Shim, J., K.A. Striebel, and E.J. Cairns, the Lithium/Sulfur Rechargeable Cell. Journal of the Electrochemical Society, 2002. 149: p. A1321.

Doughty, D.H., D.L. Coleman, and M.J. Berry. Abuse Tolerance Studies on Lithium-Sulfur (Li-S) Rechargeable Batteries. in 43rd Power Sources Conference. 2008. Philadelphia, PA.

Schrock, R.R., Catalytic Reduction of Dinitrogen to Ammonia at a Single Molybdenum Center. Accounts of Chemical Research, 2005. 38(12): p. 955-962.

* cited by examiner

*Primary Examiner* — Tracy Dove
(74) *Attorney, Agent, or Firm* — Maginot, Moore & Beck

(57) ABSTRACT

An electrochemical cell in one embodiment includes a negative electrode including a form of lithium, a positive electrode spaced apart from the negative electrode, an electrolyte, a separator positioned between the negative electrode and the positive electrode, and a current collector in the negative electrode, the current collector including a substrate material and a coating material on the surface of the substrate material, wherein the coating material does not include a form of lithium.

20 Claims, 1 Drawing Sheet

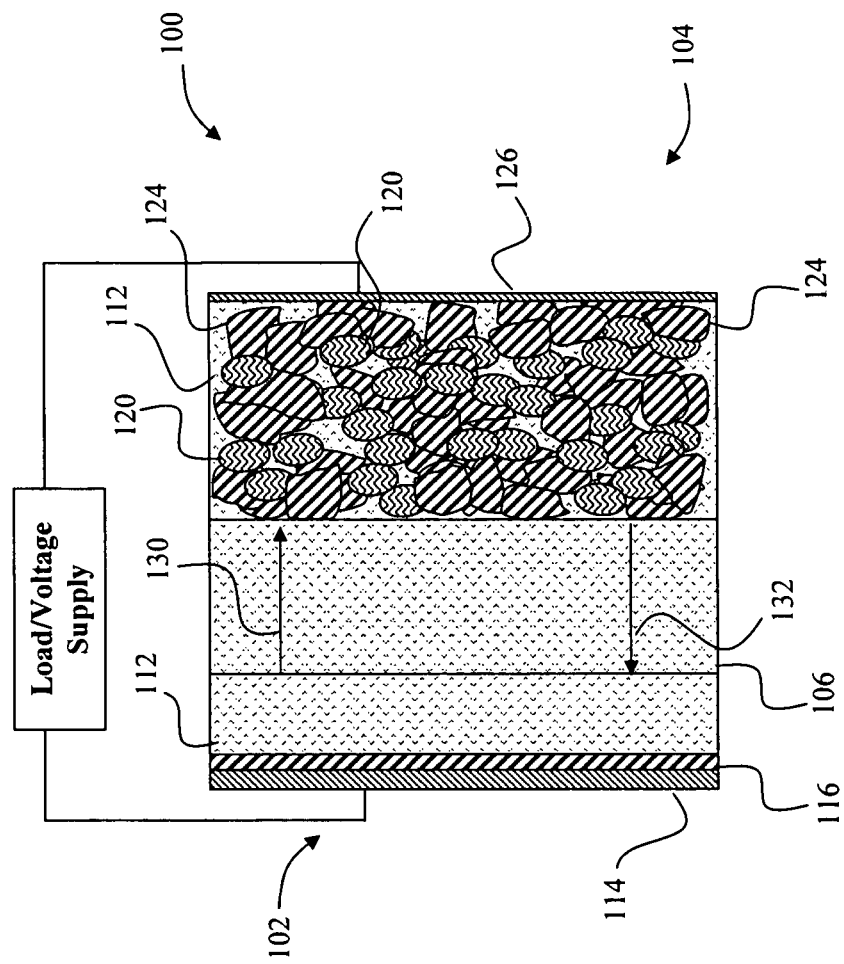

LI-ION BATTERY WITH ANODE CURRENT COLLECTOR COATING

Cross-reference is made to U.S. Utility patent application Ser. No. 12/437,576 entitled "Li-ion Battery with Selective Moderating Material" by John F. Christensen et al., which was filed on May 8, 2009; U.S. Utility patent application Ser. No. 12/437,592 entitled "Li-ion Battery with Blended Electrode" by John F. Christensen et al., which was filed on May 8, 2009; U.S. Utility patent application Ser. No. 12/437,606 entitled "Li-ion Battery with Variable Volume Reservoir" by John F. Christensen et al., which was filed on May 8, 2009; U.S. Utility patent application Ser. No. 12/437,622 entitled "Li-ion Battery with Over-charge/Over-discharge Failsafe" by John F. Christensen et al., which was filed on May 8, 2009; U.S. Utility patent application Ser. No. 12/437,643 entitled "System and Method for Pressure Determination in a Li-ion Battery" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Silicon Anode" by Boris Kozinsky et al., which was filed on May 8, 2009; U.S. Utility patent application Ser. No. 12/437,873 entitled "Li-ion Battery with Rigid Anode Framework" by Boris Kozinsky et al., which was filed on May 8, 2009; U.S. Utility patent application Ser. No. 12/463,024 entitled "System and Method for Charging and Discharging a Li-ion Battery" by Nalin Chaturvedi et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, Fluoride based electrode materials for advanced energy storage devices. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

While generally safe, the amount of energy stored within a battery as well as the materials used to manufacture the battery can present safety issues under different scenarios. Safety is particularly an issue when a battery is subjected to increased temperatures either as a result of internal processes or as a result of the environment in which the battery is located.

By way of example, when batteries are charged or discharged, they typically generate heat due to a finite internal resistance that includes ohmic, mass-transfer, and kinetic contributions. Exothermic side reactions can also generate heat within the battery. This heat generation can pose a safety risk if it is large and rapid. For instance, commercial Li-ion cells generally go into thermal runaway if the internal cell temperature climbs above the decomposition temperature of the cathode (~180 to 220° C., depending upon the chemistry and the state of charge). Often the events that lead to a temperature rise above this critical temperature are triggered at much lower temperatures. For example, exothermic anode film decomposition can occur at ~120° C., providing enough energy to raise the battery temperature above 180° C. Excessive temperature in a battery may lead to venting of gases, smoke, flames, and, in rare cases, explosion.

Undesired amounts of heat may also be generated in a battery due to undesired physical changes in the battery. By way of example, formation of an electronically conducting phase between the two electrodes (i.e., internal shorting) of the battery can lead to excessive internal discharge. Internal shorting may be caused by dendrite formation, separator melting, separator cracking, separator tearing, pinholes, or growth of some conductive material through the separator. Thus, in addition to safety concerns, dendrite formation can significantly shorten the lifespan o an electrochemical cell.

What is needed therefore is a battery that is less susceptible to dendrite formation.

SUMMARY

In accordance with one embodiment, an electrochemical cell includes a negative electrode including a form of lithium, a positive electrode spaced apart from the negative electrode, an electrolyte, a separator positioned between the negative electrode and the positive electrode, and a current collector in the negative electrode, the current collector including a substrate material and a coating material on the surface of the substrate material, wherein the coating material does not include a form of lithium.

BRIEF DESCRIPTION OF THE DRAWINGS

FIG. 1 depicts a schematic of an electrochemical cell with one electrode including a form of lithium and having a coating applied to the current collector to assist in forming a smooth lithium layer.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion cell 100, which includes a negative electrode 102, a positive electrode 104, and a separator region 106 between the negative electrode 102 and the positive electrode 104. The negative electrode 102 includes electrolyte 112 and a current collector 114. A coating 116 is provided on the current collector 114.

The negative electrode 102 may be provided in various alternative forms. The negative electrode 102 may incorporate a dense form of Li metal or a in a porous composite electrode. Incorporation of Li metal is desired since the Li metal affords a higher specific energy than graphite.

The separator region 106 includes an electrolyte with a lithium cation and serves as a physical and electrical barrier between the negative electrode 102 and the positive electrode 104 so that the electrodes are not electronically connected within the cell 100 while allowing transfer of lithium ions between the negative electrode 102 and the positive electrode 104.

The positive electrode 104 includes active material 120 into which lithium can be inserted, inert materials 124, the electrolyte 112 and a current collector 126. The active material 120 may include a form of sulfur and may be entirely sulfur. The active material 120 may incorporate a form of lithium such as a Li—SI alloy or a Li—Sn alloy.

The lithium-ion cell 100 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the negative electrode 102 during discharging and an equal amount of electrons are consumed at the positive electrode 104 as lithium and electrons move in the direction of the arrow 130 of FIG. 1.

In the ideal discharging of the cell 100, the electrons are generated at the negative electrode 102 because there is extraction via oxidation of lithium ions as lithium is plated on the coating 116 of the negative electrode 102, and the electrons are consumed at the positive electrode 104 because metal cations or sulfur ions change oxidation state in the positive electrode 104. During charging, the reactions are reversed, with lithium and electrons moving in the direction of the arrow 132.

The physical characteristics of the lithium layer that is formed on the current collector 114 is influenced by the coating 116. Specifically, use of pure forms of Li can result in shortened lifespan of a cell because Li is highly reactive. Accordingly, upon repeated cycling of a Li-anode cell, the anode undergoes significant morphology changes. For example, the initially dense metal, after a number of cycles, develops surface roughness and a sponge-like morphology. This morphology is dangerous due to increased surface area which increases the chance and severity of runaway reactions, and due to growth of metallic dendrites that can puncture the separator and cause an internal short of the cell.

The inventors believe that surface roughness develops partly because Li deposition onto the current collector during cell charging happens non-uniformly. This non-uniformity is caused in part by roughness and defects on the atomic level of the anodic current collector 114 (typically Cu metal). Li metal plating nucleates at these defect sites and the subsequent growth pattern of Li is determined by these initial sites.

The coating 116, however, encourages the growth of a smooth layer of lithium on the collector 114 regardless of surface imperfections in the substrate material. In one embodiment, this is accomplished by providing a coating 116 that exhibits a smoother surface for lithium adherence as compared to the substrate material. Accordingly, the lithium coats more uniformly onto the current collector 114.

Thus, by making the surface of the coating 116 very smooth, the anode morphology is improved thereby extending the cycle life and safety of the cell. The coating 116 may be provided in the form of pure metals and alloys, conducting oxides such as indium oxide or zinc oxide, or sulfides, etc. The coating 116 can be applied by a sputtering process or chemical deposition onto the current collector 114 during the assembly of the cell 100.

Preferably, the coating 116 is very thin to reduce cost and effects on electronic conductivity. The coating 116 need only be sufficiently thick to provide a very smooth surface on which Li metal can be electrochemically deposited with minimal initial development of roughness.

In another embodiment, the coating 116 is in the form of a thin electronically conductive coating that it has high chemical affinity for Li metal. Accordingly, the coating 116 functions as a wetting agent so that during cell charge Li does not form isolated islands or beads but rather spreads uniformly, "wetting" the entire surface of the current collector. By selecting a material with a sufficiently high affinity for Li, such as tin, magnesium, aluminum, or graphite, Li will form a uniform layer even if the coating 116 exhibits a surface roughness similar to the surface roughness of a Cu anode.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical cell, comprising:
    a negative electrode including a form of lithium;
    a positive electrode spaced apart from the negative electrode;
    an electrolyte;
    a separator positioned between the negative electrode and the positive electrode; and,
    a current collector in the negative electrode, the current collector including a substrate material and a coating material on a surface of the substrate material arranged such that the electrolyte does not contact the substrate material and such that lithium is deposited on the coating material and not upon the substrate material, wherein the coating material does not include a form of lithium.

2. The electrochemical cell of claim 1, wherein the positive electrode includes a form of sulfur.

3. The electrochemical cell of claim 2, wherein the negative electrode includes $Li_{2.33}Si$.

4. The electrochemical cell of claim 2, wherein the negative electrode includes a form of Li—Sn.

5. The electrochemical cell of claim 1, wherein the coating material comprises a metal or metal alloy.

6. The electrochemical cell of claim 5, wherein the coating material comprises a form of tin.

7. The electrochemical cell of claim 1, wherein the coating material comprises a conducting oxide.

8. The electrochemical cell of claim 7, wherein the coating material comprises an indium oxide.

9. The electrochemical cell of claim 1, wherein the coating material has a first affinity for lithium ions and the substrate material has a second affinity for lithium ions, the first affinity greater than the second affinity.

10. The electrochemical cell of claim 9, wherein the coating material comprises a form of tin and the substrate material comprises a form of copper.

11. The electrochemical cell of claim 1, wherein the coating material is applied by a sputtering process.

12. The electrochemical cell of claim 11, wherein the coating material comprises a metal or metal alloy.

13. The electrochemical cell of claim 12, wherein the coating material comprises a form of tin.

14. The electrochemical cell of claim 11, wherein the coating material comprises a conducting oxide.

15. The electrochemical cell of claim 14, wherein the coating material comprises an indium oxide.

16. The electrochemical cell of claim 11, wherein the coating material has a first affinity for lithium ions and the substrate material has a second affinity for lithium ions, the first affinity greater than the second affinity.

17. The electrochemical cell of claim 16, wherein the coating material comprises a form of tin and the substrate material comprises a form of copper.

18. An electrochemical cell, comprising:
  a negative electrode including a form of lithium;
  a positive electrode spaced apart from the negative electrode;
  an electrolyte;
  a separator positioned between the negative electrode and the positive electrode; and,
  a current collector in the negative electrode, the current collector including a substrate material and a coating material on a surface of the substrate material, wherein the coating material does not include a form of lithium and the coating material has a first affinity for lithium ions and the substrate material has a second affinity for lithium ions, the first affinity greater than the second affinity, and
  wherein lithium is deposited on the coating material and not upon the substrate material.

19. The electrochemical cell of claim 18, wherein the coating material comprises a metal or metal alloy.

20. The electrochemical cell of claim 18, wherein the coating material comprises a conducting oxide.

* * * * *